US005777687A

United States Patent [19]

De Lange

[11] Patent Number: 5,777,687

[45] Date of Patent: Jul. 7, 1998

[54] IMAGE DISPLAY SYSTEM AND MULTI-WINDOW IMAGE DISPLAY METHOD

[75] Inventor: Alphonsius A. J. De Lange, Eindhoven, Netherlands

[73] Assignee: U.S. Philips Corporation, New York, N.Y.

[21] Appl. No.: 407,421

[22] Filed: Mar. 17, 1995

[30] Foreign Application Priority Data

Mar. 29, 1994 [EP] European Pat. Off. .............. 94202808
Mar. 29, 1994 [NL] Netherlands ............ PCT/NL94/00068

[51] Int. Cl.[6] ...................................... H04N 5/265

[52] U.S. Cl. .......................... 348/563; 348/588; 348/564; 345/340

[58] Field of Search .................................. 348/564, 565, 348/566, 567, 568, 584, 586, 588; 345/340, 213; H04N 5/265, 5/272, 5/262

[56] References Cited

U.S. PATENT DOCUMENTS

| | | | |
|---|---|---|---|
| 4,218,710 | 8/1980 | Kashigi et al. | 348/584 |
| 4,961,071 | 10/1990 | Krooss | 345/340 |
| 5,068,650 | 11/1991 | Fernandez et al. | 340/799 |
| 5,517,253 | 5/1996 | De Lange | 348/584 |

FOREIGN PATENT DOCUMENTS

| | | | |
|---|---|---|---|
| 0083630 | 4/1993 | Japan | H04N 5/265 |

*Primary Examiner*—David E. Harvey
*Attorney, Agent, or Firm*—Edward W. Goodman

[57] ABSTRACT

An image display system forms an output video signal which is composed of successive frames, the output video signal including a plurality of windows, each of which contains image information from an own input video signal in each frame. The image information from the input video signals is written into a memory wherefrom subsequently successive frames of an output video signal are read, each time from a respective series of locations of the memory. Upon reading, a concatenation of the respective series of the successive frames is formed. The locations are periodically repeated in this concatenation with a period of recurrence which is longer than a single series, the locations of the respective series of each frame at an end being coincident in an overlapping fashion with the locations at the beginning of the series of a directly preceding frame. Despite the overlap, no image information of the windows will be overwritten before it has been read, provided that the overlap is smaller than the minimum number of locations used in a series between the beginning and the end of a window. In the case of rectangular windows, the minimum height of the windows thus defines the overlap.

8 Claims, 3 Drawing Sheets

IMAGE DISPLAY SYSTEM AND MULTI-WINDOW IMAGE DISPLAY METHOD

BACKGROUND OF THE INVENTION

1. Field of the Invention

The invention relates to an image display system, comprising a memory, reading means for reading successive images of an output video signal, each image being read from a respective series of locations of the memory, the output video signal comprising a plurality of windows, each of which contains image information from an own input video signal in each image, and writing means for writing the image information from the input video signals in the memory in the locations wherefrom the reading means are to read the associated window. The invention also relates to a method of forming an output video signal which is composed of successive images, the output video signal comprising a plurality of windows, each of which contains image information from an own input video signal in each image.

2. Description of the Related Art

A system of this kind is known from U.S. Pat. No. 5,068,650. Each of the video input and output signals is composed of a series of video frames, each of which represents an image. Such a frame of the output video signal is stored in the memory, each pixel location in the frame corresponding to an own memory location. Upon reading, the memory locations corresponding to successive pixel locations in the frame are successively read. In the known system, successive frames are formed by reading the memory locations corresponding to the pixel locations in the frame.

Each of the frames of the output video signal may comprise a plurality of windows with image information from different input video signals. Upon reception, the system writes this image information in the memory in the locations wherefrom it is subsequently read for the formation of the frame of the output video signal.

The output video signal and the input video signals all have substantially the same frame frequency. The frequency at which image information concerning several pixels is written into the memory, however, may be lower than the frequency at which this information is read. This is so notably in the event of sub-sampling of an input video signal in order to display the image information from this signal in a window at a reduced scale.

When the write frequency is lower than the read frequency, there is a risk of the reading "overtaking" the writing. In that case, a window in a single frame of the output video signal contains image information from different frames of the input video signal, which information relates to before and after overtaking. This causes undesirable artefacts in the display of the output video signal.

This can be prevented by utilizing two memories, each serving for the storage of a complete frame. First one memory is refreshed while the other is being read; subsequently, the other memory is refreshed while the first one is being read. This requires twice as much memory space as necessary for the storage of a single frame.

SUMMARY OF THE INVENTION

It is inter alia an object of the invention to provide an image display system whereby an output video signal can be formed which contains several windows, each of which contains image information from an own input video signal, it being possible for the input video signal to be sub-sampled without a single frame of the output video signal containing information from different frames of an input video signal, said system also requiring less than twice the amount of memory space required for the storage of a single frame.

To achieve this, the image display system in accordance with the invention is characterized in that the reading means are arranged to form a concatenation of the respective series of the successive images, the locations in the concatenation being periodically repeated with a period of recurrence which is longer than a single series, the locations of the respective series of each image having an end and a beginning with several locations, the locations at the end being coincident in an overlapping fashion with the locations at the beginning of the series of a directly preceding image. The invention is based on the insight that, despite the overlap, no image information of the windows will be overwritten before having been read, provided that the overlap is smaller than the minimum number of locations read in a series from the beginning to the end of a window. In the case of rectangular windows, the minimum height of the windows thus defines the overlap.

An "image" in the sense of the invention may correspond to a frame of the video signal as well as to a "field", i.e., for example, to one of the two parts constituting a frame of an interlaced television signal. Generally speaking, the word "image" implies a period after which a window occurs again in the video signal, or a multiple thereof.

The invention also relates to an embodiment of the image display system in which the reading means are arranged to read each window in each series up to an own last reading instant, and in which the writing means are arranged to write image information from each image of at least one input video signal up to an own last writing instant, and to select one of the respective series in the locations of which the image information is written, and to select that respective series in which the own last reading instant succeeds the own last writing instant at the shortest distance. The image information is thus written in the correct location, without the risk of overtaking, regardless of the phase of the relevant input video signal relative to the output video signal and regardless of the size of the window (provided that it is larger than the minimum size).

The invention also relates to an embodiment of the image display system in which the writing means are arranged to select said one of the respective series on the basis of a start writing instant relative to a start reading instant of the window in a currently read image, on the basis of a predetermined duration of reading of the window, and on the basis of a pre-estimated duration of a time interval in which the image information in each image arrives. The location of writing is thus determined on the basis of quantities which can be readily measured.

The invention also relates to an embodiment of the image display system in which the at least one input video signal is synchronized with the output video signal and in which the writing means are arranged to write the image information with a predetermined offset relative to a start location of the window in the series of the current image of the output video signal. In the case of synchronization, the selection of the write location can thus be more simply implemented.

The invention also relates to an embodiment of the image display system which comprises a sub-sampling unit for sub-sampling the at least one input video signal prior to writing.

The invention also relates to an embodiment of the image display system in which the memory comprises a number of segments which are independently accessible, the writing means being arranged to write the image information from the input video signals into the various segments in parallel, the reading means being arranged to read successive parts of an image line from a respective segment of the memory, each respective series commencing in the same segment. Thus, a video signal can be formed by means of memories which each have a long access time per se.

The invention is notably attractive for rectangular windows whose duration can be simply determined; however, it can also be used for windows of a different shape.

The invention also relates to a method of forming an output video signal composed of successive images, the output video signal comprising a plurality of windows, each of which each contains image information from an own input video signal in each image, said method comprising the following steps writing the image information from the input video signals into a memory, reading successive images of an output video signal from a respective series of locations of the memory, characterized in that the reading means are arranged to form a concatenation of the respective series of the successive images, the locations in the concatenation being periodically repeated with a period of recurrence which is longer than a single series, the locations of the respective series of each image having an end and a beginning with several locations, the locations at the end being coincident in an overlapping fashion with the locations at the beginning of the series of a directly preceding image.

BRIEF DESCRIPTION OF THE DRAWINGS

These and other aspects and advantages of the invention will be described in detail hereinafter with reference to the Figures. Therein.

DESCRIPTION OF THE PREFERRED EMBODIMENT

Figure 1:
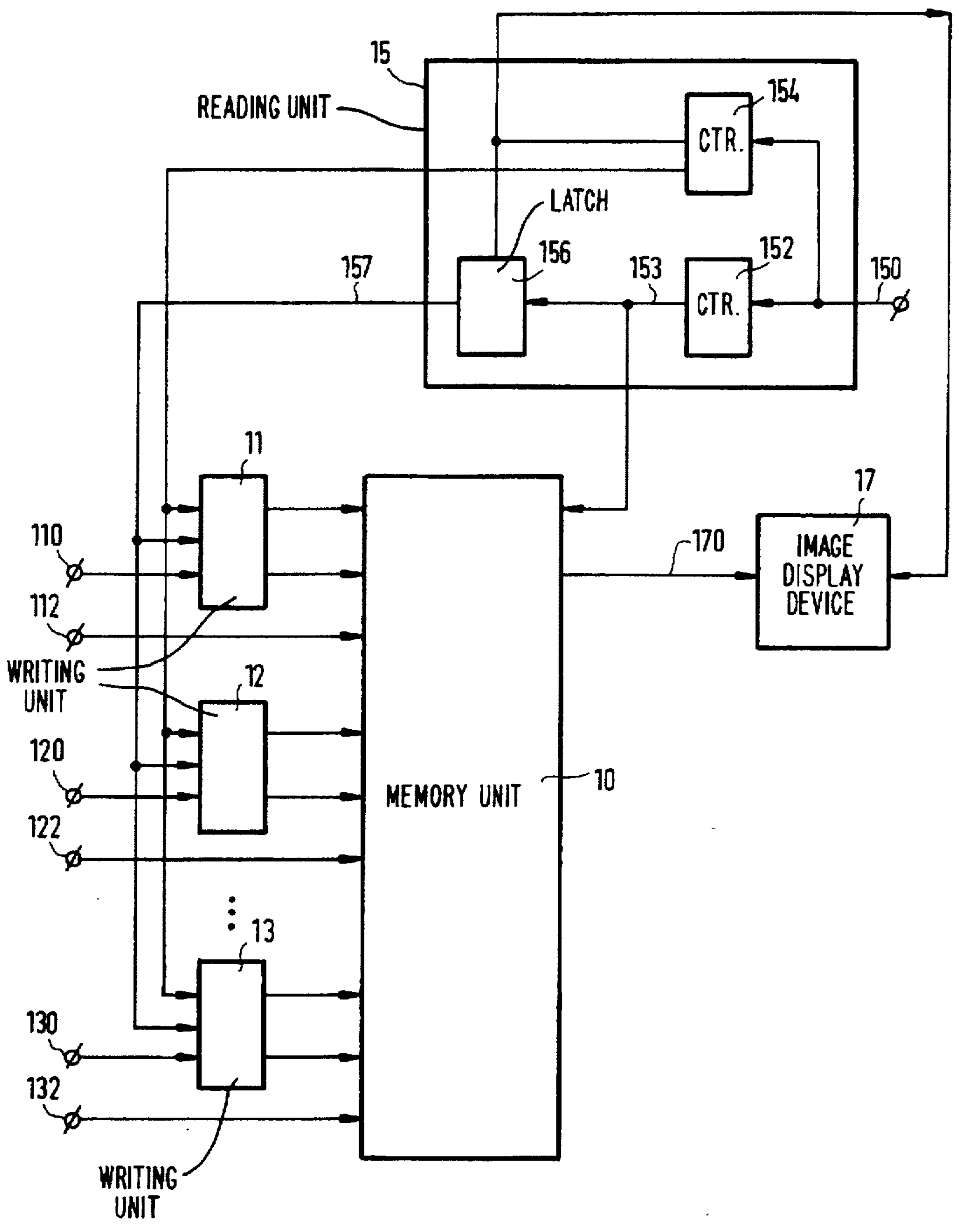
FIG. 1 shows an embodiment of an image display system in accordance with the invention.

FIG. 1 shows an embodiment of an image display system in accordance with the invention. This system comprises a number of writing units 11, 12, 13 which are coupled to a memory unit 10. Furthermore, for each writing unit 11, 12, 13 a data input 112, 122, 132 is coupled to the memory unit 10. An output 170 of the memory unit 10 is coupled to an image display device 17, for example a television monitor. The image display system also comprises a reading unit 15. This unit comprises a clock signal input 150 which is coupled to a first counter 152 and to a second counter 154. An output 153 of the first counter 152 is coupled to the memory unit 10 and to a data input of a latch 156. An output of the second counter 154 is coupled to a clock input of the latch 156 and to an image sync input of the image display device 17. The output of the latch 156 and a count output of the second counter 154 are both connected to the various writing units 11, 12, 13. Furthermore, each writing unit 11, 12, 13 has its own clock input.

The entire system may be arranged in one location, but it is alternatively possible for the image display device 17 (or notably the screen thereof) and the remainder of the system to be arranged in different locations, as in the case of a television transmitter and a receiver, a cable television center and a receiver connected thereto, and generally speaking in any service where a central arrangement forms an output video signal for a remote receiver.

Under the control of the writing units 11, 12, 13, image information originating from the data inputs 112, 122, 132 is written into a memory in the memory unit 10 during operation. This image information is read under the control of the reading unit 15 and applied as a video signal to the image display device 17 via the output 170 of the memory unit 10. The image display device 17 displays this video signal on a display screen.

The reading unit 15 generates a periodically recurrent cycle of addresses for the memory unit 10. These addresses define a cycle of locations in the memory unit 10. From the successive locations in this cycle in the memory, the memory unit 10 reads image information for, for example, successive pixels in the output video signal which is applied to the image display device 17 via the output 170. For each pixel, the image information contains, for example, 8 bits of grey information and, if desired, 8 bits of color information. The term "location" is to be interpreted in a broad sense. For example, it covers the storage space for a group of several successive pixels. Generally speaking, upon any subdivision of the memory into parts which are successively read, these parts are designated as "locations".

The cycle of addresses is generated by the first counter 152 in the reading unit 15 by counting clock pulses on the clock input 150. The first counter 152 is a modulo counter which starts to count from zero again when a maximum value "m" is reached, so that the cycle of addresses is periodically repeated. The second counter 154 counts each time up to the total number "f" of locations in a single frame of the output video signal applied to the image display device 17 via the output 170, for example, the number of pixels, when the image information for one pixel is read from each location. When this number is reached, the second counter generates an image sync pulse. (After this number has been reached, the counters will in practice be stopped for some time in order to create a blanking period without image information, which blanking period precedes the sync pulse; however, for the sake of clarity of the Figure, this is not shown).

In response to the sync pulse, the instantaneous count of the first counter 152 is transferred to the latch 156. This latch thus contains the address of the location of the first pixel of the current frame of the output video signal. The second counter applies its count, indicating which position is occupied by the information from the currently read location in the frame, to the writing units 11, 12, 13.

The writing units 11, 12, 13 ensure that image information originating from the inputs 112, 122, 132 is written into the locations of the cycle, so that upon reading, this image information is transferred to the image display device 17.

Figure 2:
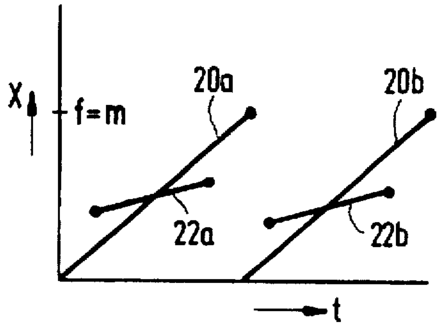
FIG. 2 shows a first graph of memory addresses as a function of time.

FIG. 2 shows a first graph with memory address values "x" as a function of time "t". A first trace 20*a*, 20*b* in this graph represents the address values as generated by the reading unit 15 for the case where the length "m" of the cycle of read addresses equals the number "f" of locations in a frame of the output video signal. (For the sake of clarity, the trace 20*a*, 20*b* is shown in the form of two continuous lines, even though the addresses evidently can assume integer values only). It will be evident that the trace 20*a*, 20*b* commences anew as soon as the value m (=f) is reached. In that case the two parts 20*a*, 20*b* of the first trace are associated with two successive frames.

FIG. 2 also shows a second trace 22*a*, 22*b* in which the values of the addresses at which image information of an input video signal is written are plotted as a function of time. The second trace comprises two parts 22*a*, 22*b* which are associated with two successive frames of the input video signal. This is based on the assumption of the presence of a "sub-sampled" input video signal of the same frame frequency as the output video signal in which the write addresses are incremented at a lower frequency than the read addresses; consequently, the slope of the second trace 22*a*, 22*b* is less steep than that of the first trace 20*a*, 20*b*.

FIG. 2 shows that the first trace 20*a*, 20*b* and the second trace 22*a*, 22*b* intersect. Prior to the intersection in the second part 20*b* of the first trace, information will be read from the memory which has been written therein during the second part 22*b* of the second trace. However, beyond the intersection information will be read from the memory which has been written therein during the first part 22*a* of the second trace, i.e., information originating from a frame earlier than the frame before the intersection. This means that the image information read for a single frame originates from two different frames of the input video signal; this could give rise to undesirable artefacts.

Figure 3:
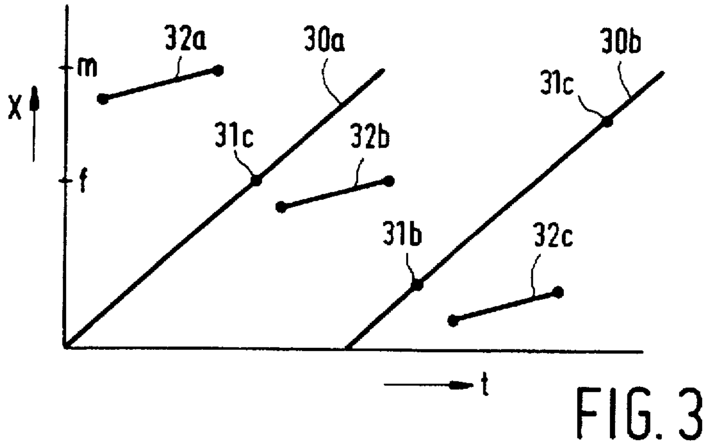
FIG. 3 shows a second graph of memory addresses as a function of time.

FIG. 3 shows a second graph of memory addresses as a function of time; in this case such artefacts do not occur. The Figure again shows a first trace 30*a*, 30*b* and a second trace 32*a*, 32*b*, 32*c*. The length "m" of the cycle of locations wherefrom the image information for the output video signal is read is greater than the length "f" of a single frame in the Figure. As a result, the starting point of the successive frames is, each time, shifted in the cycle of locations. The starting points 31*a*, 31*b*, 31*c* are plotted on the first trace 30*a*, 30*b* in FIG. 3. By making the length "m" of the cycle sufficiently longer than the length "f" of a single frame, sufficient room for reading new image information can be created between the instants at which image information is read from the memory, without reading and writing overtaking one another.

Figure 4:
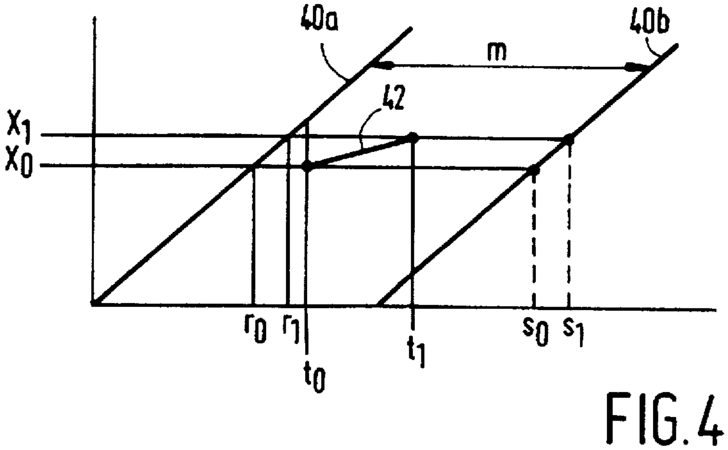
FIG. 4 shows a third graph of memory addresses as a function of time.

FIG. 4 shows a third graph of memory addresses as a function of time. The minimum required length "m" of the cycle of locations wherefrom the image information is read will be deduced on the basis of this graph. FIG. 4 again shows a first trace 40*a*, 40*b* and a second trace 42, representing the addresses of reading and writing, respectively, as a function of time.

On the vertical axis, there are also indicated the locations $x_0$ and $x_1$. These are the locations in which image information from a single frame of the input video signal is written into the memory first and last, respectively. On the horizontal axis, the instants $t_0$, $t_1$ are indicated. These are the instants at which image information from a single frame of the input video signal arrives at the memory first and last, respectively. Also indicated on the horizontal axis are the instants $s_0$, $s_1$. These are the instants at which image information from a single frame of the input video signal is read from the memory first and last, respectively.

Finally, on the horizontal axis there are indicated the instants $r_0$, $r_1$. These are the instants at which the locations bearing the addresses $x_0$ and $x_1$ have been read for the last time prior to writing. Because the cycle of addresses has a length "m", it holds that $r_0=s_0-m$ and $r_1=s_1-m$ (where the instants $s_0$, $s_1$ and $r_0$, $r_1$ are expressed in units of a time interval between the reading of successive locations).

If intersecting of the first trace 40*a*, 40*b* and the second trace 42 is to be avoided, it must hold that $$r_0<t_0, \text{ which means that } s_0-m<t_0$$

$$t_1<s_1$$

The instants $s_0$ and $s_1$ are dependent on the position in the frames of the output video image for which the window is destined. Generally speaking, the positions of pixels in a frame will be denoted by $y_i$. For each position $y_i$ it holds that the image information associated with this position will be read at instants $s_i$ in conformity with $$s_i=y_i+n*f+b$$

Herein, the instants $s_i$ are expressed in units of a time interval between the reading of successive locations. The frame number "n" is an integer number and "b" is the instant at which the beginning ($y_i=0$) of an initial frame (n=0) is read.

Let the start and end positions of a window be referred to as $y_0$ and $y_1$, respectively. Thus, these are the positions in the frames of the output video signal wherefrom image information is read from the input video signal first and last, respectively. From these start and end positions of a window, $y_0$, $y_1$, the instants $s_0$ and $s_1$ at which the associated image information will be read are deduced:

$$s_0=y_0+n*f+b$$

$$s_1=y_1+n*f+b$$

Therein, the frame number "n" is the lowest frame number for which the second above inequality ($t_1<s_1$) holds. The time difference $\Delta_1=s_1-t_1$ between the reading and writing of the last image information arriving in the window, therefore, will never be greater than f (this is because if $\Delta_1>f$, a reduction of "n" by one would also produce $t_1<s_1$).

The first above inequality ($s_0-m<t_0$) implies that m must at least be equal to the maximum possible value of $\Delta_0=s_0-t_0$. This can be written as $\Delta_0=\Delta_1+I$, wherefrom it follows that $$I=(t_1-t_0)-(y_1-y_0)$$

Therein, $t_1-t_0$ is the time required to write a window. This time will never be greater than "f", being the time required to read an entire frame (in units of a time interval between the reading of successive locations), because the frame frequency of the input video signal and that of the output video signal are substantially the same. $y_1-y_0$ is the window length: the number of locations in the cycle between the beginning and the end of the window. For rectangular windows this is h*l, where h is the height of the window and l the length of an image line.

Given a minimum value W for the window length $y_1-y_0$, it follows that $$I<f+W$$

Summarizing, if intersecting of the first trace 40*a*, 40*b* with the second trace 42 is to be avoided, it must hold that $$m>\Delta_0$$

whereas $\Delta_0=\Delta_1+I$, where $\Delta_1<f$ and $I<f+W$. Thus, it follows that no overtaking occurs between the writing and reading of the memory provided that $$m>2*f-W$$

The number of locations "m" in the cycle in which the memory is read, therefore, must be larger than f (the number of locations in a frame) but may be kept smaller than 2*f.

For a standard CCIR television signal comprising 576 information-carrying lines per frame and a memory unit with locations for the storage of the image information of 512 lines, therefore, windows comprising at least 64 lines are feasible; thus, in the case of an interlaced frame approximately one quarter of the height of the frame. These dimensions are very advantageous in practice.

In principle, the invention can be applied to frames as well as to fields (a frame of a television signal is composed by interlacing two fields successively occurring in the video signal).

Figure 5:
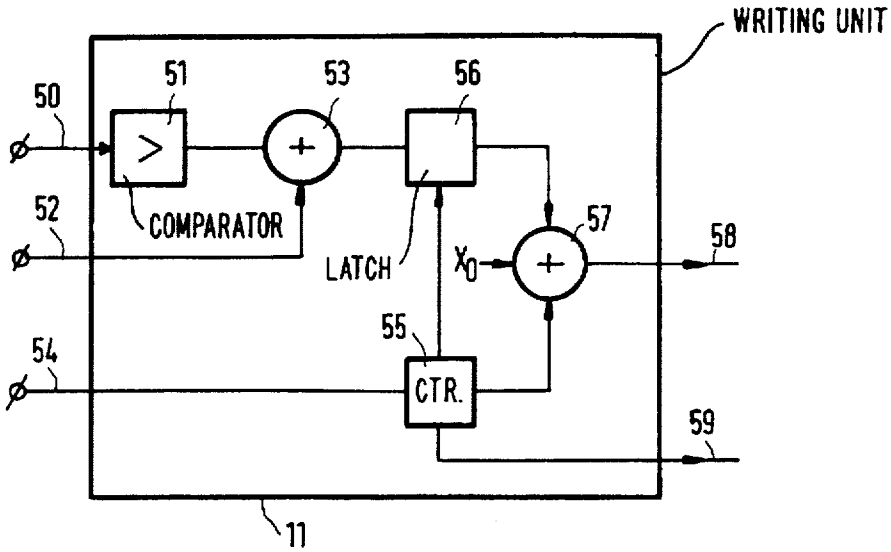
FIG. 5 shows a writing unit.

FIG. 5 shows a writing unit suitable for use as the writing unit 11 in an image display system as shown in FIG. 1. The writing unit 11 comprises a first input 50 which is coupled to a comparator 51 which comprises an output which is coupled to a first input of an adder 53. A second input 52 of the writing unit 11 is coupled to a second input of the adder 53. An output of the adder 53 is coupled to a data input of a latch 56. The output of the latch 56 is coupled to a first input of a further adder 57. The writing unit comprises a third input 54 which is coupled to a clock input of a counter 55. Outputs of the counter are coupled to a clock input of the latch 56, to a second input of the further adder 57, and to a first output 59, respectively. An output of the further adder 57 is coupled to a second output 58.

During operation, the first input receives a signal which represents the number in the cycle of the location which has been read last from the memory in the memory unit 10, taken from the beginning of the currently read frame. The comparator compares this number with a threshold value T:

$$T=y_1-\Delta t$$

($\Delta t$ is the value of $t_1-t_0$ predicted on the basis of the frame frequency) and applies the smallest multiple n*f of "f" greater than the difference between this number and the threshold T to the adder 53. The second input 52 receives the address $b_0$ of the first location of the currently read frame. The adder 53 adds the number received from the comparator 51 to the address; the adder thus outputs the number $b_0+n*f$.

The counter 55 receives a clock signal which serves to clock the information on the data input (112, 122 or 132 in FIG. 1). By counting the pulses of this clock signal, the counter 55 determines when the data information destined for the window arrives on the data input. This is indicated to the latch 56 which stores the output signal $b_0+n*f$ of the adder 53 in response thereto. Furthermore, on the first output 59 the counter 55 forms an enable signal for the writing in the memory unit 10. This enable signal is activated upon the arrival of the first image information destined for a window, and remains intermittently active until the arrival of the last image information. The enable signal is active, for example exclusively in the part of each image line associated with the window.

The counter 55 also outputs the count $(t-t_0)$ relative to the beginning of the image information for the window. The further counter 57 adds the contents $b_0+n*f$ of the latch 57 to the count "$(t-t_0)$" of the counter and the start location $y_0$ of the window in the frames of the output image, and supplies the sum $$(t-t_0)+y_0+b_0+n*f$$

on the second output 58. This sum constitutes an address for the memory unit 10; of this address only the remainder $$(t-t_0)+y_0+b_0+n*f \bmod m$$

is used upon division by the length "m" of the cycle of locations. The components of the writing unit 11, such as the adders 55, 57, therefore, need be constructed only for modulo "m" arithmetic.

The writing unit 11 is thus capable of writing the image information of a window in the memory unit 10 without requiring prior knowledge of the phase relationship between the various input signals and the output signal. Evidently, the writing unit of FIG. 5 is merely a non-limitative example. It is only essential that the writing unit 11 each time shifts the addresses of the locations prior to writing, so that the image information enters the correct window upon reading and all image information of one input image after writing is read from one and the same output image, preferably in such a manner that the end of the image information within the window is read at a first opportunity possible. If the relative phase of the input video signals and the output video signal is unknown, therefore, a selection must be made as to how many frames this first opportunity is situated beyond the currently read frames.

For example, a writing unit which comprises only a detection unit for the beginning of the information to be written and a counter may also suffice. The counter is then incremented by the clock signal associated with the input video signal and supplies addresses for the memory unit 10. The counter can be initialized at the described correct address by means of a processor.

If the phase relationship is known in advance, the comparator 51, for example is superfluous because the number "n" is then fixed. The sequence in which the various contributions to the address (the beginning of the frame $b_0$, the position of the window in the frame $y_0$, the number n of frames offset, etc.) are combined and the starting point with respect to which they are counted can also be chosen at random. The exact instant at which the latch 56 is clocked is can be chosen in different manner, provided that the choice of "n" is adapted thereto, if necessary.

Use can be made of an arbitrary number of writing units 11, 12, 13, i.e. one for each input signal or one per window. All writing units 11, 12, 13 can, in principle, be constructed as shown in FIG. 5. However, if it is known that a given input signal will never have to be sub-sampled, so that it will always have the same pixel frequency as the output video signal, a simpler writing unit 11, 12, 13 suffices for the relevant input video signal, because the risk of writing being overtaken by reading does not exist. This simpler writing unit can select, for example $b_0+y_0$ as the first location for writing, so that n is always 0.

The memory unit 10 receives enable and address signals from all writing units 11, 12, 13. A plurality of writing units 11, 12, 13 can then simultaneously generate an active enable signal, and the reading unit 15 may also be active. In that case, the memory unit 10 ensures, if necessary by buffering, that all write operations are successively executed. A co-pending Patent Application (PHN 14.791; EP Application No. 94200755.0; U.S. Ser. No. 219,129; JP 94-58788) by the same inventer and assigned to the same assignee, for example describes a memory unit 10 suitable for this purpose.

The memory in this memory unit 10 is subdivided into segments (not shown). Each segment corresponds to a column of the image. During the reading of each image line, therefore, image information is thus successively read from a series of successive segments. For simplicity of addressing it is desirable that each frame commences in the same segment, and that the difference between the length of a frame and the length of the cycle of locations of the memory in which the image information is read amounts to an integer number of lines.

Figure 6:
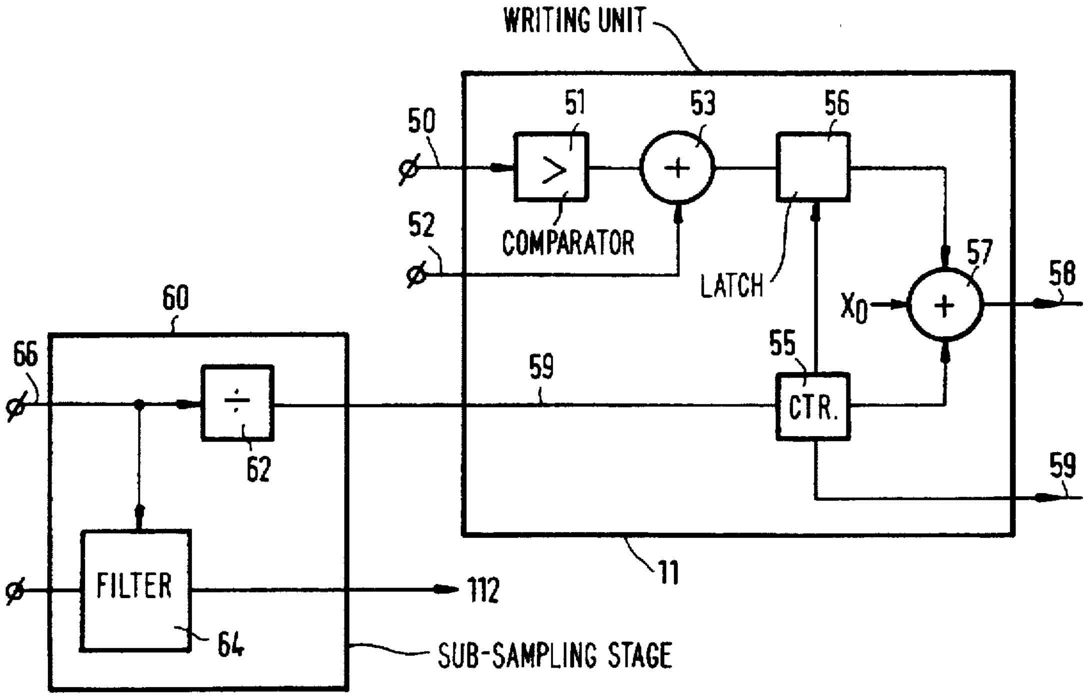
FIG. 6 shows a writing unit comprising a sub-sampling stage.

FIG. 6 shows a writing unit 11 which comprises a sub-sampling stage 60. The writing unit 11 is as shown in FIG. 5. The sub-sampling stage 60 comprises a divider 62 which is arranged between a clock input 66 and the third input 54 of the writing unit. The sub-sampling stage 60 also comprises a filter 64 which precedes the data input 112.

During operation, for example, an input signal having a pixel and frame frequency substantially equal to the pixel and frame frequency of the output signal is presented to the sub-sampling stage 60. The pixel frequency is divided by a sub-sampling factor, for example 2, in the divider 62, so that only one pixel is stored in the memory 10 for every two pixels in the input signal. The writing unit thus also operates at a lower pixel frequency. The frame frequency, however, remains the same. If necessary, the filter 64 provides anti-alias filtering.

I claim:

1. A method of forming an output video signal composed of successive images, the output video signal forming a plurality of windows, each of which contains image information from a respective input video signal in each frame, said method comprising the steps:

writing the image information from the input video signals into a memory; and reading successive frames of an output video signal from a respective series of locations of the memory, characterized in that said step of reading successive frames comprises:

forming a sequence of locations in said memory inclusive of said respective series of locations, said sequence of locations having a number m of locations which is greater than the number f of locations in said respective series of locations, said sequence of locations including an end and a beginning of more than one of said respective series of locations, in which a predetermined number of locations at the end of said sequence of locations, forming an ending of a series of locations corresponding to a present frame, are coincident in an overlapping fashion with a corresponding number of locations at a beginning of the series of locations corresponding to a directly preceding frame.

2. An image display system comprising:

a memory having locations for storing image information;

writing means for writing image information from input video signals into the memory in respective groups of locations, each of said input video signals having successive frames of image information which are repeatedly written by said writing means into locations in said memory; and reading means for reading from said memory, said stored video signals forming, on display, successive frames of an output video signal, the successive frames of the output video signal being read from respective series of locations inclusive of said respective groups of locations, each of said successive frames including a plurality of windows formed, respectively, by the stored image information in said groups of locations, characterized in that said reading means are arranged to repeatedly read a sequence of locations in said memory inclusive of said respective series of locations, said sequence of locations having a number m of locations which is greater than the number f of locations in said respective series of locations, said sequence of locations including an end and a beginning of more than one of said respective series of locations, in which a predetermined number of locations at the end of said sequence of locations, forming an ending of a series of locations corresponding to a present frame, are coincident in an overlapping fashion with a corresponding number of locations at a beginning of the series of locations corresponding to a directly preceding frame.

3. An image display system as claimed in claim 2, wherein said reading means is arranged to read each group of locations forming each window in the frame formed by each respective series of locations up to a last reading instant of said respective group of locations, and wherein said writing means is arranged to write image information from each frame of at least one input video signal up to a last writing instant of said frame, said writing means being further arranged to select one of the respective series of locations of which the image information is to be written, said selected series of locations having the shortest distance between said last writing instant and said last reading instant succeeding said last writing instant.

4. An image display system as claimed in claim 3, in which the writing means are arranged to select said one of the respective series of locations on the basis of a start writing instant relative to a start reading instant of the group of locations forming a window in a currently read frame, on the basis of a predetermined duration of reading of group of locations forming the window, and on the basis of a pre-estimated duration of a time interval in which the image information in each frame arrives.

5. An image display system as claimed in claim 4, in which the at least one input video signal is synchronized with the output video signal and in which the writing means are arranged to write the image information with a predetermined offset relative to a start location of the group of locations forming the window in the series of locations of the current frame of the output video signal.

6. An image display system as claimed in claim 3, characterized in that said image display system comprises a sub-sampling unit for sub-sampling the at least one input video signal prior to writing.

7. An image display system as claimed in claim 2, in which the memory comprises a number of segments which are independently accessible, the writing means being arranged to write the image information from the input video signals into the various segments in parallel, the reading means being arranged to read successive parts of an image line from a respective segment of the memory, each respective series of locations commencing in the same segment.

8. An image display system as claimed in claim 2, in which at least one window is rectangular and comprises a sequence of sub-series of mutually equal numbers of successively read locations in each series of locations, interruptions of the same length being present between the sub-series.

* * * * *